Feb. 11, 1964    T. M. GOLDHAFT ETAL    3,120,834
METHOD OF INTRODUCING ADJUVANTS INTO AVIAN EGG INTERIORS
Filed Nov. 1, 1961
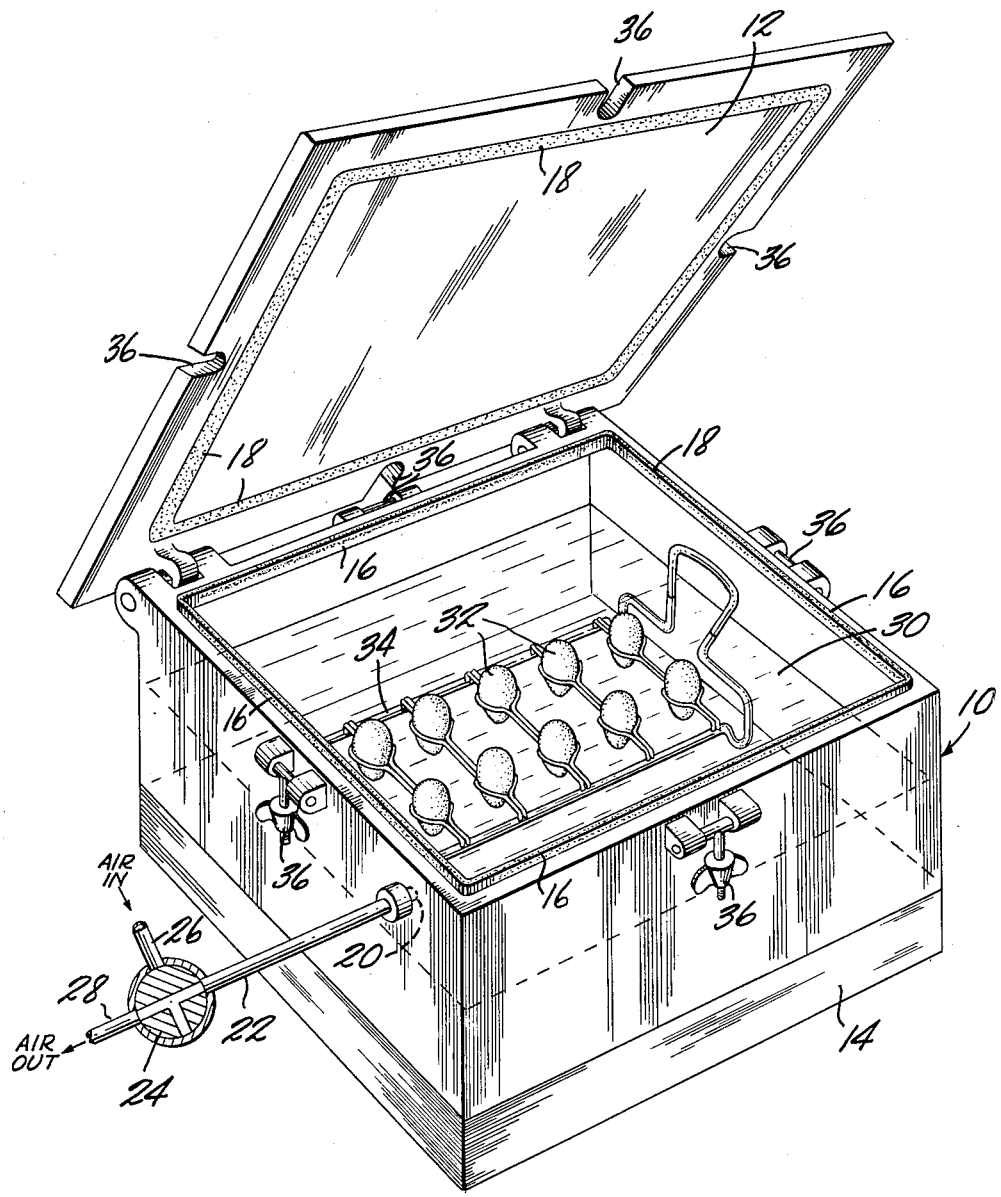
INVENTORS.
TEVIS M. GOLDHAFT &
NATHAN E. WERNICOFF
BY
Eyre, Mann & Lucas
ATTORNEYS.

3,120,834
METHOD OF INTRODUCING ADJUVANTS INTO
AVIAN EGG INTERIORS
Tevis M. Goldhaft and Nathan E. Wernicoff, Vineland, N.J., assignors to Vineland Poultry Laboratories, Vineland, N.J., a partnership
Filed Nov. 1, 1961, Ser. No. 149,328
9 Claims. (Cl. 119—1)

This invention relates to a method of causing adjuvants which may be in a liquid carrier to pass into the interior of an avian egg through the intact shell thereof.

Much progress has been made in the poultry field in supplying the interiors of whole intact eggs with adjuvant substances such as antibiotics, sulfonamides, vitamins, enzymes, nutrients, as well as inorganic salts. One early method of introduction involved the use of a hypodermic needle with which the egg shell was pierced and then, after innoculation of the adjuvant into the egg magma and withdrawal of the needle, the resulting small hole was sealed with paraffin wax or some like material. More recently, other techniques have been developed such as dipping an egg into a solution of adjuvant. While these methods have been used commercially, they are often difficult to control, slow and have other disadvantages.

We have now discovered that beneficial adjuvants contained in a liquid carrier can be readily introduced into the interior of an avian egg through the intact shell thereof simply by placing the egg in the liquid carrier, reducing the pressure above the liquid to below atmospheric pressure, and then raising the pressure above the liquid back to about atmospheric pressure. While we do not understand completely the reasons for our results, we have noted that a large quantity of the liquid carrier and the adjuvant readily passes through the interstices of the egg shell as the pressure above the liquid is raised back to atmospheric pressure. Thereafter, except perhaps for wiping the egg shell dry, no further treatment is required.

The great advantages of our process are that it may be simply and efficiently carried out with inexpensive equipment. In fact, the only equipment necessary is a container which can be hermetically sealed and from which air can be withdrawn to reduce the pressure therein. The process may be positively controlled and large quantities of adjuvant are rapidly introduced into the interior of eggs as a result of the process. With suitable automatic controls, the process may be readily carried out on a continuous, mass production basis.

Our process may be used with all forms of avian eggs which may be edible non-embryonated eggs or non-edible embryonated eggs. We have in fact carried out our process with embryonated eggs and therefter incubated the eggs. The eggs hatched in the normal manner and the chicks were all healthy and showed no adverse conditions as a result of the process.

Various types of adjuvants may be introduced into the interior of avian eggs with our process. For example, antibiotics such as penicillins, tetracyclines, streptomycins and others can be dissolved in a suitable solvent and this solution used in the process to provide a supply of the antibiotic which will pass through the egg shell. Various other materials such as sulfonamide drugs, vitamins, nutrients, enzymes, preservatives and inorganic salts such as iron and copper salts can be dissolved to prepare treating solutions which will provide a supply of these materials for the interior of the egg. Where the adjuvant is itself a liquid, no liquid carrier is required. An example of this, is the introduction of vegetable oils or similar liquid materials into egg shells for the purpose of increasing storage life and this may be readily achieved with our process. In addition, it is possible to introduce virulent microorganisms into the egg magma with our process and this is of great advantage in biological research where cultures of microorganisms in avian embryos are customarily employed for experimental studies. A similar technique is often used to produce disease preventive antibodies and vaccines and our process can be used with excellent advantage for this purpose. Accordingly, it will be understood that the term adjuvant, as used in the specification and claims herein, is intended to mean any of the above mentioned specific materials as well as any other material which, for one reason or another, is desired to be introduced into an intact avian egg.

Concentration of the particular adjuvant in the liquid carrier is not of importance and if desired concentrations as low as 1% by weight of the liquid carrier may be employed. As the concentration of the adjuvant is increased, more of it will pass into the egg interior under the same process conditions. In general, we have achieved excellent results with adjuvant concentrations in the range of 1% to 10% by weight of the liquid carrier. However, lower or higher concentrations will also give beneficial results.

Preferably, the adjuvant and liquid carrier are so selected that the combination of the two results in a true solution. For example, if tetracycline is to be employed as the adjuvant, then one of its water soluble salts such as the hydrochloride is dissolved in water to form an aqueous solution or the free antibiotic may be dissolved in a non-toxic organic solvent to form an organic solution. However, the invention is not limited to the use of solutions only, as uniform dispersions of finely divided adjuvant in a liquid carrier as, for example, colloidal suspensions of microorganisms or certain metal hydroxides can be prepared which will also pass through the egg shell in accordance with our process. Thus, either for the purpose of preparing solutions or dispersions, liquid carriers such as water or non-toxic organic liquids such as vegetable oils, alcohols, ketones, esters and combinations thereof may be employed in our process.

In filling a container with the liquid carrier, it is important that an air space be provided above the level of the liquid. For best results we prefer that, after the container has been partially filled and the eggs placed therein, the ratio of the volume of free air space to the total volume of the container be about 1:10. However, lower or higher ratios will operate just as well as it is only necessary that some free air space remain above the level of the liquid. The container should have a cover or lid which will seal the container hermetically and means should be provided to withdraw air from the air space above the level of the liquid after the container has been sealed.

In placing the eggs to be treated in the container, a wire rack or similar means can be employed to bring the eggs in contact with the liquid carrier. We prefer to totally submerge the eggs in the liquid to obtain maximum penetration of the adjuvant therein. However, this is not necessary and, if desired, the eggs may be lowered only partially into the liquid carrier.

After the eggs have been placed in the liquid carrier, air is withdrawn from the air space above the solution with a conventional vacuum pump to reduce the pressure therein to below atmospheric pressure. In this connection, we prefer to reduce the pressure to about 5 to 10 mm. of mercury. However, the pressure may be further reduced as desired. There is no upper limit to which the pressure must be reduced and beneficial results will be achieved as long as the pressure in the air space is reduced even if only slightly below the prevailing atmospheric pressure. However, for best results in commercial operations, we prefer that the pressure be reduced to one not exceeding about 600 mm. of mercury.

It is important that the reduced pressure above the liquid carrier be maintained for at least about 30 seconds. The time required to reduce the pressure to any particular value will vary according to the size of the air space and the capacity of the vacuum pump that is employed. By stating that the reduced pressure should be maintained for at least 30 seconds, we mean that the time during which the pressure in the air space is being continuously lowered by the pump in addition to the time when a specific lower pressure is reached and maintained as a steady state should not be less than about 30 seconds. This will give sufficient time for achieving conditions of equilibrium inside the container between the eggs, liquid carrier and the free air space. If desired, the time of reduced pressure may be increased up to about 120 seconds or more. However, holding times longer than about 120 seconds do not give any added advantage and merely slow down the process.

After reduced pressure has been maintained for at least about 30 seconds, the pressure in the space above the liquid is raised back to about atmospheric pressure. This is accomplished most simply by opening a valve located in the line through which air was withdrawn from the container to permit the air of the atmosphere to re-enter the air space. However, if desired inert gas such as nitrogen or any other similar gas can be bled back into the air space to raise the pressure back to atmospheric pressure. As the pressure is raised to atmospheric pressure, a substantial quantity of the liquid carrier and the adjuvant therein will pass very quickly through the interstices of the egg shell into the interior of the egg. Accordingly, when the pressure has reached about atmospheric in the air space the container may be opened and the eggs removed therefrom. If the eggs are fertile embryonated eggs, they may then be transferred immediately to an incubator chamber in conventional manner. On the other hand, edible non-embryonated eggs can be dried and then packed in cartons immediately for shipment.

Further details of our invention will be readily understood by reference to the accompanying drawing which shows a perspective view of a form of apparatus which may be used for carrying out our process.

As shown in the drawing a container 10 having a lid 12 is supported on a base 14. The lid and upper edges 16 of the container are provided with gasket means 18 which cooperate to provide a hermetic seal when engaged with each other. A small opening 20 is located near the upper portion of one side wall of the container which communicates with a tube 22 attached to the side wall and thereby provides a passageway for air to move into and out of the container. A valve 24 is connected to the tube which can assume three different positions in which the tube may be sealed against entry or exit of air, or air may be admitted into the tube from the extension 26, or air may be withdrawn from the tube through extension 28. Extension 28 is connected to a conventional vacuum pump (not shown).

In carrying out the process, a liquid carrier 30 containing an adjuvant is poured into the container 10 with the liquid level maintained below the opening 20 and providing an air space in the upper portion of the container. Thereafter, a number of eggs 32 are placed in the liquid and held therein by means of the wire basket 34. Next, the lid 12 is lowered and secured to the body of the container by means of a cammed latch 36 which holds the lid tightly engaged with the container side walls and establishes a hermetic seal therebetween. The valve 24 is then turned to the proper position and air is withdrawn from the air space in the container through the tube 22, valve 24 and extension 28 by the action of the vacuum pump connected to extension 28. When the pressure in the air space has been reduced to the desired level, the valve 24 is turned to the position which seals tube 22 against entry or exit of air and the vacuum pump, if desired, is turned off. After reduced pressure has been maintained in the container for at least 30 seconds including the time of withdrawal of air by the vacuum pump, the valve 24 is turned to the position which permits air to enter the tube 22 through extension 26. Thereupon, the pressure in the container is quickly raised back to atmospheric pressure and the lid 12 may then be raised and the eggs 32 removed from the container. The apparatus is now ready to receive the next batch of eggs which are to be treated.

While one specific form of apparatus has now been described for carrying out our process, it will be obvious that wide variations or modifications are possible in the apparatus which is employed. For example, the size of the container can be increased as desired to handle any desired number of eggs at one time. Furthermore, the apparatus can be equipped with electronic controls for operation from a remote point on a continuous, mass production basis. Other nonessential variations will be obvious to those skilled in the art.

The following examples represent in the opinion of the inventors the best embodiments of the invention:

*Example I*

A container similar to the one illustrated in the drawing was partially filled with a 1% aqueous solution of a blue food dye which is certified by the Food and Drug Administration and sold commercially under the name F.D. & C. Blue No. 1. Six chicken eggs were immersed in this solution after which the container was sealed and the pressure in the air space above the dye solution was reduced to 5 mm. of mercury. The reduced pressure including the time required to reach it was maintained for 60 seconds after which air was permitted to reenter the air space whereupon the pressure therein increased back to atmospheric pressure. The container was then opened and the eggs removed from the solution. These eggs were cracked open and it was observed visually that a large quantity of the blue dye had penetrated into the egg albumin through the hard shell of the egg and the membrane separating the shell from the albumin of the egg.

*Example II*

The procedure of Example I was repeated except that the pressure was reduced to 600 mm. of mercury and the reduced pressure above the liquid solution was maintained for 90 seconds instead of 60 seconds.

Again it was observed that a large quantity of the blue dye had passed through the shell and membrane of the egg into the albumin.

*Example III*

The procedure of Example I was repeated except that the pressure was reduced to 250 mm. of mercury and the reduced pressure above the liquid solution was maintained for 120 seconds instead of 60 seconds.

After the eggs were opened it was seen that a large quantity of the blue dye had penetrated into the egg albumin through the egg shell and membrane.

*Example IV*

The procedure of Example I was repeated except that a 1% aqueous solution of copper sulfate was used in place of the solution of dye material. After removal from the copper sulfate solution, the eggs were wiped dry and then broken open. The egg albumin was assayed for copper by the second and third identification tests listed on page 901, XVI edition of U.S. Pharmacopeia. The tests were positive for copper for every one of the treated eggs.

*Example V*

In this example twelve eggs were placed in a 10% aqueous solution of sodium sulfathiazole in an apparatus similar to the one shown in the drawing. The pressure was reduced in the air space to approximately 10 mm. of mercury and the reduced pressure above the solution was maintained for about 120 seconds. Upon completion of the process, the egg albumin from the twelve treated eggs was assayed for sodium sulfathiazole and this value was compared to a similar assay made on the egg albumin of six control eggs which were not treated with the process. The value for the treated eggs was 8.6 mg. higher than that of the control eggs and this substantial increase was more than what would be required to kill bacteria in the interior of the eggs.

*Example VI*

In this example utilizing a container similar to the one illustrated in the drawing, three eggs were placed in an aqueous solution of erythromycin thiocyanate in which the antibiotic concentration was about 1250 parts per million. Thereafter, the container lid was sealed and the pressure in the air space was reduced and maintained at about 5 mm. of mercury over a total time of 60 seconds. After the pressure in the container was raised back to atmospheric pressure, the three eggs were removed and all of the egg albumin assayed for erythromycin content by the suitable test described in the XVI edition of U.S. Pharmacopeia. A similar assay was made on the albumin of two untreated control eggs. The average erythromycin content for each of the treated eggs was 33.5 mcg. while the average content for each of the control eggs was only 3.98 mcg.

*Example VII*

Three eggs were treated with the procedure of Example VI except that the reduced pressure was maintained over a total time of 180 seconds and air was admitted into the container slowly instead of all at once to gradually raise the pressure back to atmospheric pressure in the container. The average erythromycin content for each of these treated eggs was 30.3 mcg. showing that the speed with which the pressure in the container was raised back to atmospheric pressure did not significantly affect the process.

*Example VIII*

The procedure of Example I is repeated except that an aqueous solution of chlortetracycline hydrochloride in 2% concentration is used in place of the blue dye solution. Upon completion of the process, the eggs are opened and the egg albumin tested for chlortetracycline residue by the standard Food and Drug Administration test of the Dept. of Health Education & Welfare entitled "Mycoides Cup Plate Method for Determination of Chlortetracycline, Tetracycline and Oxytetracycline Concentrations in Serum and Body Fluids." The test is positive indicating the presence of chlortetracycline in every one of the treated eggs.

While we have now described our process as including the step of placing the adjuvant and liquid carrier in the hermetically sealable container initially, it is also possible to inject the liquid carrier into the container as part of the air stream which is permitted to enter the container to raise the pressure therein back to about atmospheric pressure. In this embodiment of our process, we simply place the eggs alone in the container and then reduce the pressure therein with the holding time of at least 30 seconds as previously described. Thereafter, the adjuvant and liquid carrier is mixed with the flow of air rushing into the container during the time that the pressure therein is being raised by injecting droplets of the liquid into the tube 22 through which the air passes. As a result, the liquid carrier enters the container as a fine mist which impinges upon the eggs therein and passes through the shell into the egg interiors. However, smaller volumes of adjuvant and liquid carrier are introduced into the egg by this embodiment and, for best results, we prefer to place the adjuvant and liquid carrier in the container initially as previously described.

It will be understood that it is intended to cover all changes and modifications of the preferred embodiment of the invention which do not constitute departures from the spirit and scope of the invention.

We claim:

1. The method of introducing an adjuvant contained in an egg shell-penetrating liquid carrier into the albumin of an avian egg through the intact shell thereof which comprises the steps of partially filling a container with the liquid carrier so as to leave an air space above the level of the liquid within the container, placing the egg in the liquid carrier, sealing the container hermetically, withdrawing sufficient air from the sealed container to reduce the pressure in the air space therein to one not exceeding about 600 mm. of mercury, maintaining the reduced pressure for at least about 30 seconds, and then raising the pressure in the air space to about atmospheric pressure.

2. The method in accordance with claim 1 in which the pressure in the air space is reduced to between about 5 to 10 mm. of mercury 3. The method in accordance with claim 1 in which the reduced pressure is maintained for from about 30 to 120 seconds.

4. The method in accordance with claim 1 in which the egg is totally submerged in the liquid carrier.

5. The method of introducing an adjuvant contained in an egg shell-penetrating liquid carrier into the albumin of an avian egg through the intact shell thereof which comprises the steps of dissolving an adjuvant in a solvent to form a liquid solution, partially filling a container with the liquid solution so as to leave an air space above the level of the solution within the container, totally submerging the egg in the solution, sealing the container hermetically, withdrawing sufficient air from the sealed container to reduce the pressure in the air space therein to one not exceeding about 600 mm. of mercury, maintaining the reduced pressure for at least about 30 seconds, admitting air into the container and thereby raising the pressure in the air space therein to about atmospheric pressure, and then removing the egg from the solution.

6. The method in accordance with claim 5 in which the egg is fertile and embryonated and in which after removal from the solution the egg is incubated.

7. The method of introducing an adjuvant contained in a liquid carrier into the albumin of an avian egg through the intact shell thereof which comprises the steps of placing an egg in a container so as to leave an air space therein, sealing the container hermetically, withdrawing air from the sealed container and thereby reducing the pressure in the air space therein, maintaining the reduced pressure for at least about 30 seconds, then admitting into the container a mixture of air and finely divided particles of the liquid carrier containing the adjuvant, thereby raising the pressure therein back to about atmospheric pressure, and removing the egg from the container.

8. The method in accordance with claim 7 in which the pressure in the air space is reduced to between about 5 to 10 mm. of mercury.

9. The method in accordance with claim 7 in which the reduced pressure is maintained for from about 30 to 120 seconds.

References Cited in the file of this patent

UNITED STATES PATENTS 2,851,006 Taylor ---------------- Sept. 9, 1958

FOREIGN PATENTS 335,586 Great Britain ----------- Sept. 29, 1930
673,765 Great Britain ----------- June 11, 1952